United States Patent [19]

Yang

[11] Patent Number: 5,627,564

[45] Date of Patent: May 6, 1997

[54] GRAPHIC ON-SCREEN DISPLAY METHOD

[75] Inventor: Dong-Ha Yang, Seoul, Rep. of Korea

[73] Assignee: L G Electronic Inc., Rep. of Korea

[21] Appl. No.: 995,549

[22] Filed: Dec. 22, 1992

Related U.S. Application Data

[63] Continuation of Ser. No. 657,454, Feb. 19, 1991, abandoned.

[30] Foreign Application Priority Data

Feb. 28, 1990 [KR] Rep. of Korea ............ 90-2710

[51] Int. Cl.$^6$ .................. G09G 5/00; H04N 5/44
[52] U.S. Cl. ............... 345/146; 345/158; 348/734
[58] Field of Search ............... 340/709, 710,
340/712, 747; 358/183, 22, 194.1; 341/176;
359/142, 146; 345/145, 146, 156, 157,
158; 348/569, 734, 588, 600; H04N 5/44,
5/445, 5/45

[56] References Cited

U.S. PATENT DOCUMENTS

| | | | |
|---|---|---|---|
| 4,587,520 | 5/1986 | Astle | 340/709 |
| 4,656,603 | 4/1987 | Dunn | 340/747 |
| 4,718,112 | 1/1988 | Shinoda | 358/194.1 |
| 4,722,882 | 2/1988 | Mical | 340/712 |
| 4,746,919 | 5/1988 | Reitmeier | 341/23 |
| 4,914,516 | 4/1990 | Duffield | 358/183 |
| 4,959,721 | 9/1990 | Micic et al. | 340/712 |
| 4,965,557 | 10/1990 | Schepers et al. | 358/194.1 |
| 4,989,081 | 1/1991 | Miyagawa et al. | 358/194.1 |
| 5,194,954 | 3/1993 | Duffield | 358/183 |
| 5,210,611 | 5/1993 | Yee et al. | 358/194.1 |
| 5,253,066 | 10/1993 | Vogel | 358/194.1 |

FOREIGN PATENT DOCUMENTS

| | | | |
|---|---|---|---|
| 59-41047 | 7/1984 | Japan | 340/709 |

OTHER PUBLICATIONS

Sharp Video Cassette Recorder Operation Manual, pp. 7 and 15–25, Osaka Japan.

Using *1–2–3*,® Special Edition. Carmel, Indiana: Que Corporation, 1987.

*Primary Examiner*—Richard Hjerpe
*Assistant Examiner*—Kara Farnandez Stoll
*Attorney, Agent, or Firm*—Anthony J. Casella; Gerald E. Hespos

[57] ABSTRACT

An on-screen display suitable for a graphic on-screen display is disclosed. The on-screen display method according to the present invention includes: step of graphically displaying OSD menus by generating font addresses for the graphic to be displayed after initializing the rows and columns constituting the graphic, upon inputting of the menu key; step of inversely displaying the relevant block by designating the address through the user's selection of the position control keys; and step of accessing to the menu work area for the relevant menu by inputting an enter key after the designation of the block, thereby performing the operation of the menu selected by the user.

6 Claims, 6 Drawing Sheets

PROGRAM MENU

1. CLOCK SET
2. NORMAL PROGRAM
3. DAILY PROGRAM
4. WEEKLY PROGRAM
5. PROGRAM REVIEW

PRESS DIGIT KEYS TO
   SELECT FEATURE
PRESS ENTER TO QUIT

OPTION MENU

1. AUTO SEARCH
2. FAVORITE CHANNELS
3. COUNTER RESET
4. COUNTER MEMORY

PRESS DIGIT KEYS TO
   SELECT FEATURE
PRESS ENTER TO QUIT

AUDIO MENU

1. STEREO/MONO/SAP
2. STEREO/LEFT/RIGHT
3. DOLBY ON/OFF

PRESS DIGIT KEYS TO
   SELECT FEATURE
PRESS ENTER TO QUIT

FIG. 3
(PRIOR ART)

GRAPHIC ON-SCREEN DISPLAY METHOD

This application is a continuation of application Ser. No. 07/657,454 filed Feb. 19, 1991, now abandoned.

FIELD OF THE INVENTION

The present invention relates to an on-screen display, and particularly to an on-screen display which is suitable for a multi-menu on-screen display.

BACKGROUND OF THE INVENTION

As shown in FIG. 1, the conventional on-screen display is constituted such that a timer microcomputer 2 receiving key signals from a remote control 1 is connected to an (on screen display) circuit 6. A 12 V power source is connected through a switching transistor 3 to both the on-screen display integrated circuit 6 and to a switching integrated circuit 7. The base of the switching transistor 3 is connected to the collector of a switching transistor 4 having a grounded emitter. OSD (on screen display) signals which are outputted from the timer microcomputer 2, are supplied to both the base of the switching transistor 4 and to the switching integrated circuit 7. The on-screen display integrated circuit 6, which is connected to an oscillator 5, is connected to a switching terminal of the switching integrated circuit 7. A video signal input terminal 10 is connected to another switching terminal of the switching integrated circuit 7. Finally the switching integrated circuit 7 selects either the output of the on-screen display integrated circuit 6 or the input of the video signal input terminal 10 in accordance with the OSD signal before outputting its output through a video signal output terminal 20.

Now the operation of the conventional on-screen display will be described based on the above constitution.

As shown in FIG. 3, in the conventional on-screen display, numerals and characters showing the functions of the respective menus are displayed, and then, the relevant numerals are selected. Then, the selected numerals are key-inputted so that the menu region can be accessed.

That is, an OSD signal is emitted from the timer microcomputer 2 upon manipulating an OSD button (on-screen display button) (not shown) of the remote control 1, and this OSD signal is supplied to both the base of the switching transistor 4 and to the control terminal of the switching integrated circuit 7. Further, the timer micom 2 supplies various data such as OSD data, reset, clock, chip select and the like to the on-screen display integrated circuit 6. Thus, the OSD signal turns on the switching transistor 4, and as a consequence of the turning-on of the switching transistor 3, the 12 V power source is supplied to the on-screen display integrated circuit 6. Further, the switching integrated circuit 7 is switched over, such that, instead of the inputting of the video signals 10, an on-screen display picture should be outputted through the video signal output terminal 20 in accordance with the output of the on-screen display integrated circuit 6.

Under this condition, the on-screen display integrated circuit 6 processes the various data which are supplied from the timer microcomputer 2 by the help of the function of the oscillator 5. Then the integrated circuit 6 outputs the on-screen display picture as shown in FIG. 3 to a line out and to a modulator. Then, if the user key-inputs the numerals immediately preceding the displayed menu while watching the on-screen display picture through the monitor, then the menu work area can be accessed.

However, according to the conventional on-screen display, a large number of the on-screen displays are divided into several pages, and therefore, the input keys have to be pushed several times. Further, in order to access the preceding page, the whole pages have to be gone through, and, because of the character displays for the various functions, the user is confused, as well as making it difficult to carry out the use.

Therefore it is the object of the present invention to provide an on-screen display in which all the above described difficulties are overcome.

SUMMARY OF THE INVENTION

The subject invention is directed to a graphic on-screen display method using a remote controller to select options available with a VCR and TV. Available options are displayed graphically on the TV screen with each option having a unique lateral and longitudinal font address on the TV screen. Each font address has a background color and a graphic color. All font addresses but one have the same background and graphic colors. However, one font address has an inverse display of background and graphic colors. Directional signals are generated by the remote controller to move the inverse display laterally and/or longitudinally from one graphic display to another. When the inverse graphic representation coincides with the graphic display for a desired VCR option, a selection signal is generated with the remote controller to access the function selected. The method of the subject invention avoids the tedious repetition of advancing through several menu selection screens.

BRIEF DESCRIPTION OF THE DRAWINGS

The above object and other advantages of the present invention will become more apparent by describing in detail the preferred embodiment of the present invention with reference to the attached drawings in which:

FIG. 3 illustrates the forms of the pictures of the conventional on-screen display;

DESCRIPTION OF THE PREFERRED EMBODIMENT

The present invention will be described referring to FIGS. 4A–4C, 5 and 6. Generally, the existing character pattern has a font format in the form of 12×18 (lateral×longitudinal) dots, and in forming a graphic pattern according to the present invention, 6 lateral fonts and 3 longitudinal fonts are combined, thereby forming 72×54 dots.

Figure 6:
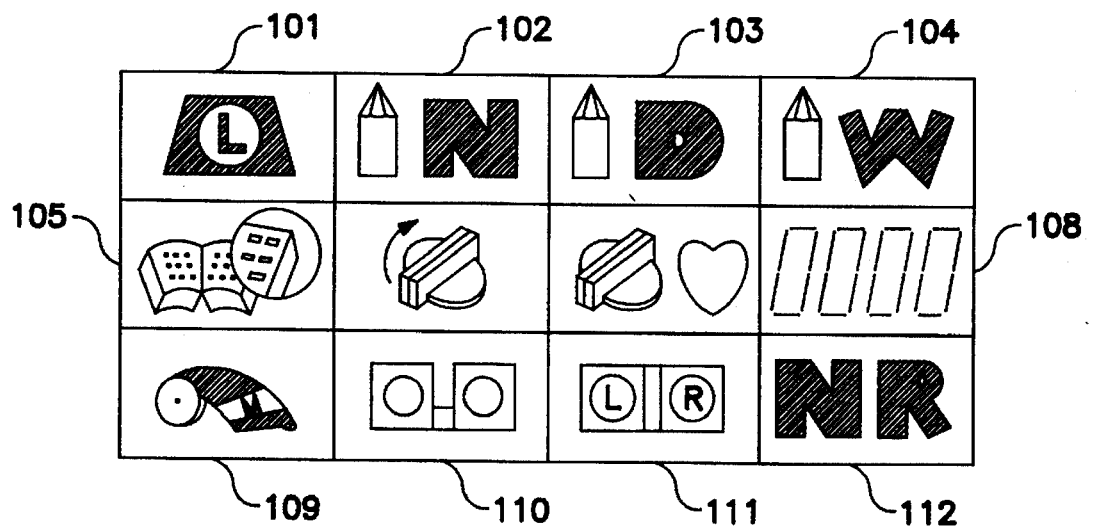
FIG. 6 illustrates examples of the graphic on-screen display according to the present invention.

In order to distinguish the selected ones on the respective blocks of the displayed graphic picture, the graphic color and the ground color of the monitor are exchanged with each other, thereby creating an inversed form. An example of the graphic on-screen display is illustrated in FIG. 6, and this is divided into 12 blocks 101–112, the respective blocks being graphic expressions of the menus which are shown in Table 1 below.

TABLE 1

Program menus for the respective blocks

| Block (FIG. 6.) | Program menu |
|---|---|
| 101 | CLOCK SET |
| 102 | NORMAL PROGRAM |
| 103 | DAILY PROGRAM |
| 104 | WEEKLY PROGRAM |
| 105 | PROGRAM REVIEW |
| 106 | AUTO SEARCH |
| 107 | FAVORITE CHANNELS |
| 108 | COUNTER RESET |
| 109 | COUNTER MEMORY |
| 110 | STEREO/MONO/SAP |
| 111 | STEREO/LEFT/RIGHT |
| 112 | DOLBY ON/OFF |

Figure 4A:
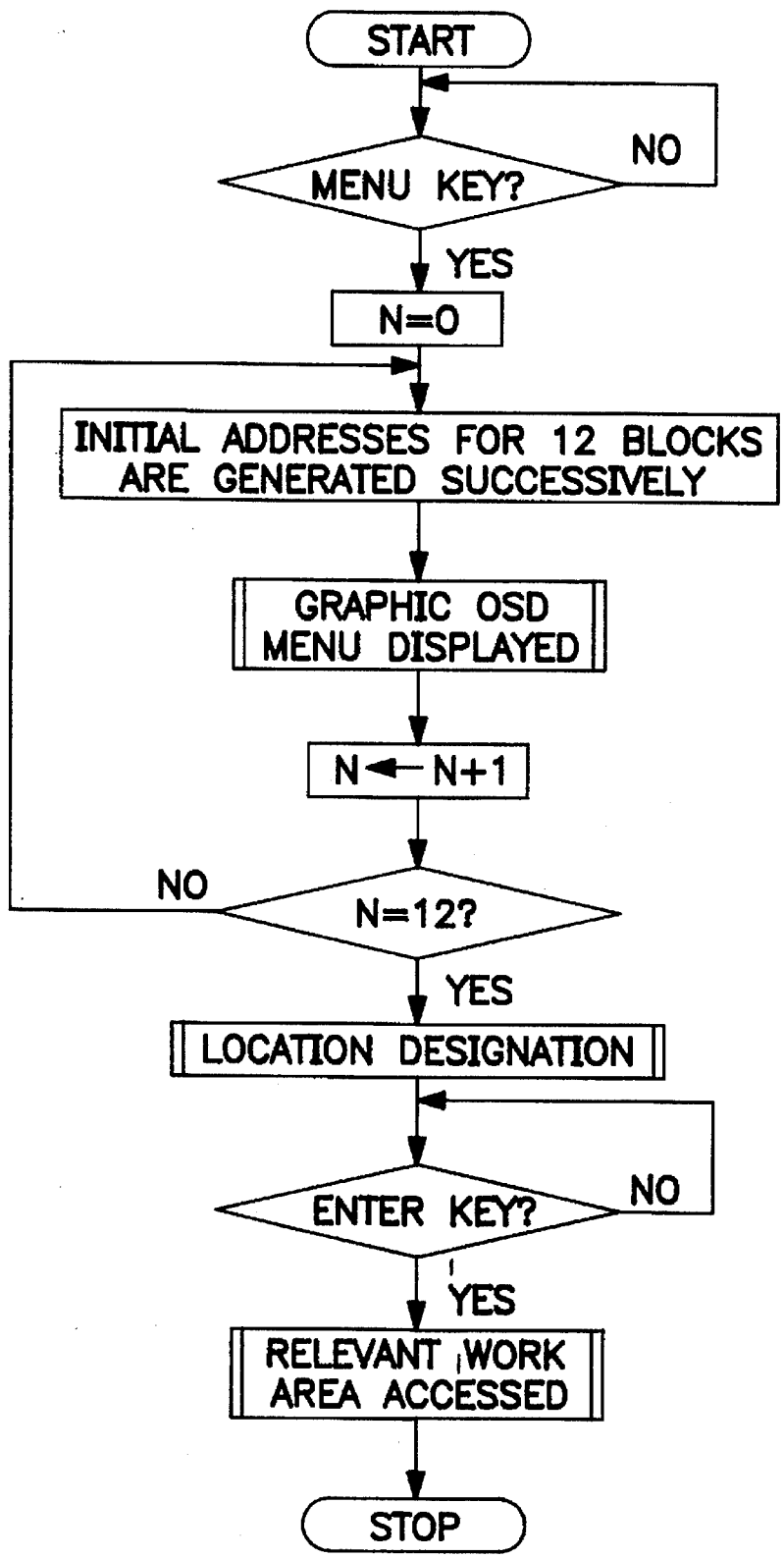
FIGS. 4A to 4C are the flow chart showing the graphic on-screen display according to the present invention.
Figure 4B:
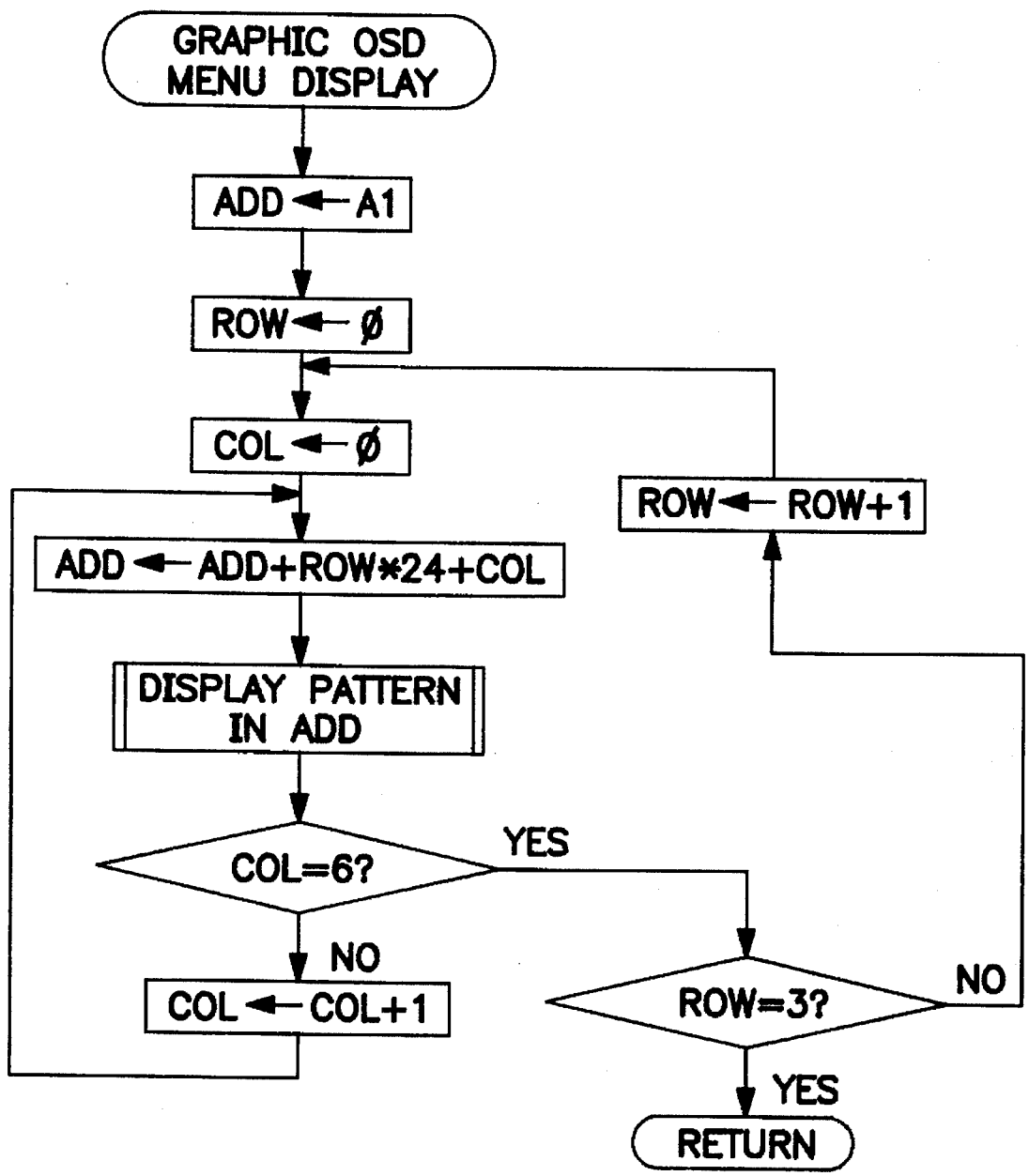
Figure 4C:
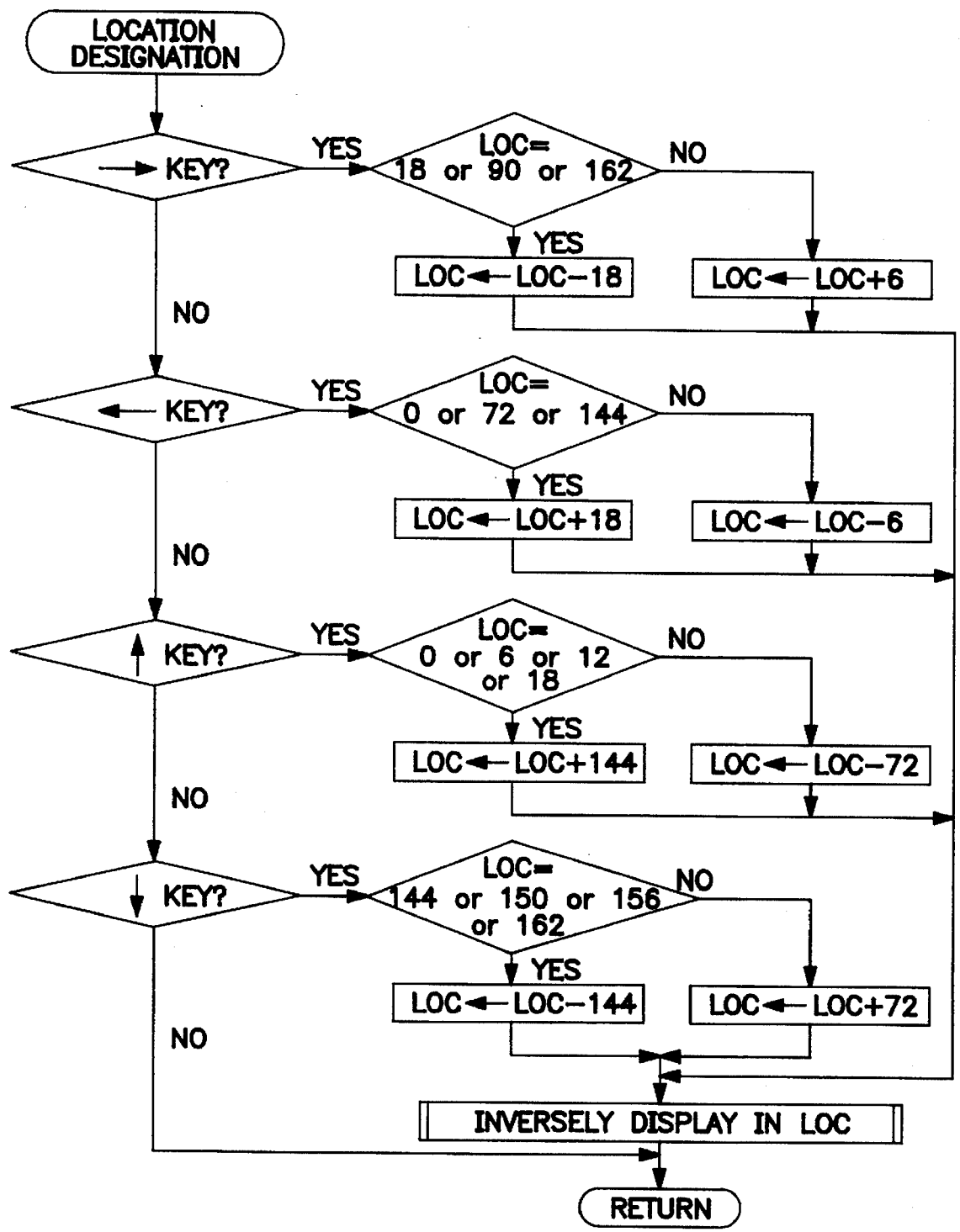

FIGS. 4A to 4C are flow charts showing the graphic on-screen display method according to the present invention, and the display method comprises: a graphic on-screen display routine as shown in FIG. 4A, a graphic OSD menu display subroutine of FIG. 4B accompanying the routine of FIG. 4A, and a location designation subroutine of FIG. 4C. Further as shown in FIG. 2, the controls are made by means of a remote control 1 which includes: position control keys ←,→, ↑, ↓ for shifting the positions of the graphic blocks; a MENU key; and an ENTER key.

The graphic on-screen display method according to the present invention will be described in further detail below.

Figure 1:
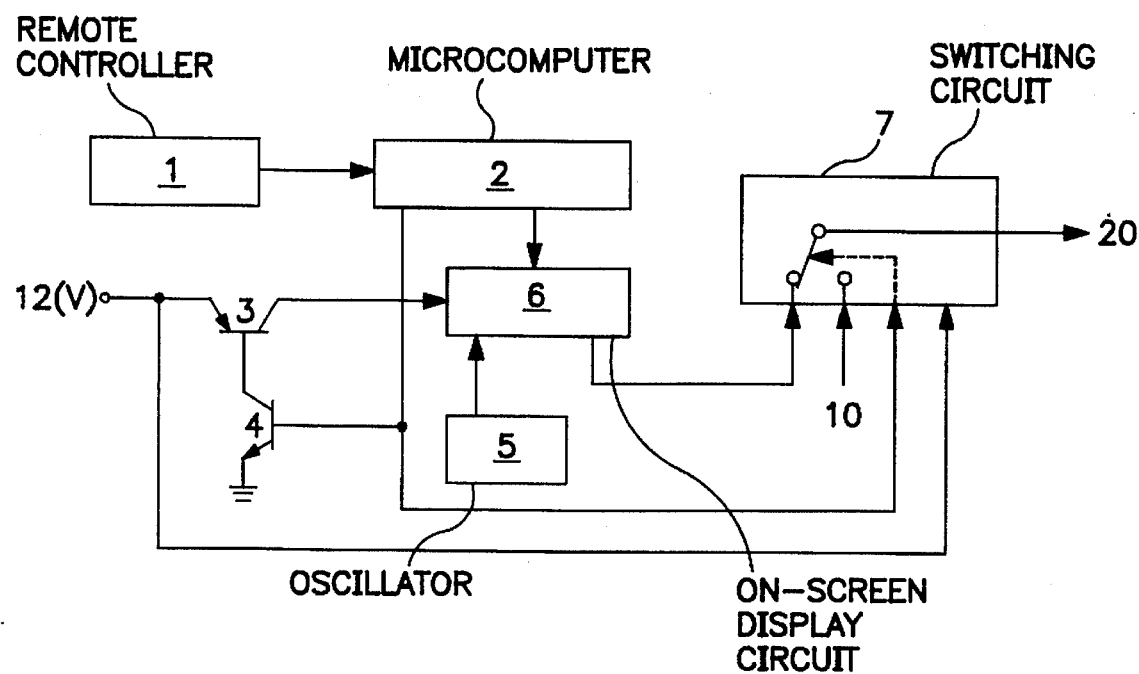
FIG. 1 is block diagram showing the constitution of the conventional on-screen display.
Figure 2:
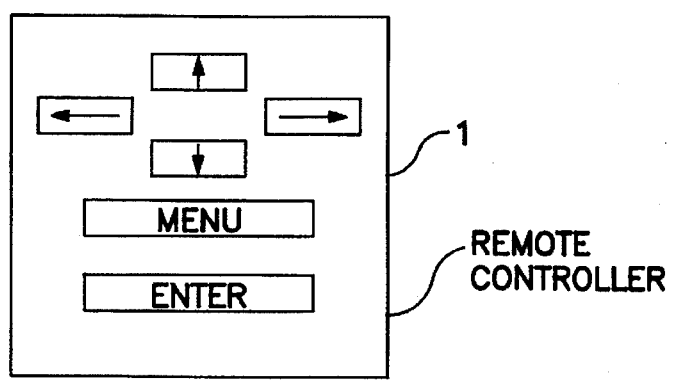
FIG. 2 illustrates an example of the shape of the remote control as a part of the circuit of FIG. 1.

First, if the menu key of the remote control of FIG. 2 is pressed, the graphic blocks of FIG. 6 are displayed on the monitor. Under this condition, the clock set block 101 is displayed in an inverse form through the initial selection. Thereafter, if the user repeatedly pushes the position control keys of the remote control 1 in the intended direction, the relevant (selected) block is displayed in an inverse form, while, if the block wanted by the user is selected, the menu work area can be accessed by pressing the enter key of the remote control 1, thereby enabling performance of the intended function.

Now the graphic on-screen display according to the present invention will be described in further detail as to its operations.

The total flow process of the graphic on-screen display method according to the present invention is illustrated in FIG. 4A. As shown in this drawing, first, a checking is made as to whether the menu key of the remote control 1 is pressed, and if it is found that the menu key is not pressed, it is made sure that the menu key is continuously pressed. If the menu key is pressed, n is set to 0, and then, an initial address A1 for the first graphic block is generated (A1=0), the relevant graphic block being displayed thereafter. Then n is continuously increased (n←+1), and initial addresses A1 are generated accordingly (A1=6,12,18,72 . . . ), thereby displaying the graphic blocks corresponding to the initial addresses.

In this way, 12 block addresses Add for the graphic blocks to be displayed are generated so as for the OSD graphic menus to be displayed in graphics, and the addresses are indicated by the user by means of the position control keys (←,→, ↑, ↓) so as for the blocks to be displayed in inverse forms. Then a judgement is made as to whether the enter key of the remote control is pressed, and if the enter key is not pressed, the selected blocks are displayed in inverse forms by the user by means of the position control keys in order to check as to whether the enter key is pressed. If the enter key is pressed, the user approaches to the menu work area for the selected menu among the 12 menus, and then, the selected operation is carried out, thereupon terminating the on-screen display.

The displaying of the OSD menu during the above described operation is carried out in a manner described below. That is, as shown in the subroutine of FIG. 4B, the initial address is generated in the form of font address, and the numbers of the rows and columns of the fonts for forming the graphic pattern are initialized (row←0, col←0). Then the font address Add for the graphic to be displayed is designated (Add←Add +Row, *24+col), and from the designated addresses Add, block addresses consisting of 6 columns (6 laterals fonts) and 3 rows (3 longitudinal fonts) are generated, so that the graphic OSD menu should be outputted to the monitor. This operation is repeated as many times as the number of the menu, thereby outputting the 12 graphics into the monitor as shown in FIG. 6.

Figure 5:
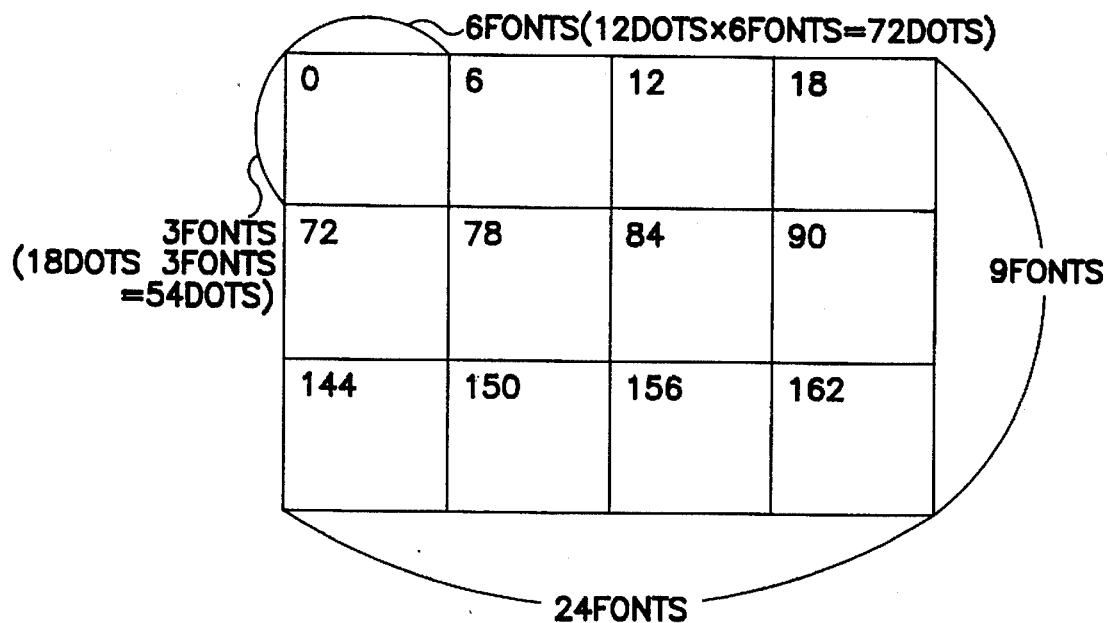
FIG. 5 illustrates an examples of the graphic pattern of FIG. 4.

That is, if the subroutine of FIG. 4B is performed once, a font address Add in which the initial address A1 is "0" as shown in FIG. 5 is generated, so that the graphic menu for the first block 101 of FIG. 6 should be displayed. Then, n is increased (n←n+1), initial addresses A1 are generated (6, 12, 18, 72), and this operation is repeated 12 times (n=12 ?), so that the graphic menus for the 12 blocks should be displayed.

The position control subroutine for displaying the relevant blocks in inverse forms by the user by means of the selected position control keys is shown in FIG. 4C in a block diagram in which the first address LOG for the graphic block to be displayed in an inverse form can be obtained when the position control keys (←,→, ↑,↓) of the remote control 1 are pressed.

When the position control key is inputted, a judgement is made as to what the first address (to be called "LOG" hereinbelow) for the graphic block to be displayed is. In the case of a last left or right block, the leftward and rightward position control keys ((←,→) are inputted, and then, the first addresses for the left and right blocks are indicated (LOC←LOC+18, LOC←LOC-18). In the case of the last upper and lower blocks, the upward and lowward position control keys (↑,↓) are inputted, and the first addresses for the last upper and lower blocks are designated (LOC←LOC+144, LOC←LOC-144). Meanwhile, in other cases, the first addresses for the next upper and lower blocks are designated (LOC←, LOC-6, LOC←LOC-72) by means of the position control keys (←,→,↑,↓) thereby displaying the relevant blocks in inverse forms. Thereafter, if the enter key is inputted, the respective menu work areas for the relevant blocks are approached, so that the operations for the selected menus should be performed.

According to the graphic on-screen display method of the present invention, the tedious repetitions of the characters can be avoided in designing the on-screen of VTR and TV in which the functions are increasingly multiplied. Thus, instead, graphics are used, so that users should be able to use VTR and TV in a more, convenient way. Further, the method of use can be transferred through the narrow space of the display picture in such a manner that all the functions can be displayed within a single picture, thereby reducing the number of times of pressing the keys of the remote control.

What is claimed is:

1. A method for displaying on a TV screen each of a plurality of selectable optional functions for a VCR and for selecting a desired one of said optional functions, from among said displayed functions on a single on-screen display, with a remote controller, said method comprising the steps of:

generating a single on-screen display signal with the remote controller for producing on the TV screen a display comprising a plurality of graphic expressions corresponding respectively to each of the optional VCR functions, each said graphic expression being available for selection and defining a graphic block having a unique lateral and longitudinal font address on the TV screen, and each said graphic block having a graphic color disposed on a background color, the graphic color for one said graphic block being substantially the same as the background color for the other said graphic blocks, and the background color for said one graphic block being substantially the same as the graphic color for the other of said graphic blocks, such that said one graphic block is displayed in an inverted manner;

selectively generating lateral and longitudinal directional control signals with the remote controller for moving the inverted manner display laterally and longitudinally, among said plurality of graphic expressions available for selection, to a lateral and longitudinal font address corresponding to the graphic expression of the desired optional function of the VCR to display said graphic expression of the desired optional function in an inverted manner; and generating a selection signal with the remote controller for selecting the optional function having the inverted manner display expression on said single on-screen display, whereby the method enables selection of an optional function from among said plurality of graphic expressions available for selection with a single selection from a single on-screen display.

2. The on-screen display method as claimed in claim 1, wherein, upon inputting signals by means of leftward, rightward, upward and lower position control keys on said remote controller, a judgement is made as to what a first address LOC for the graphic block is; in the case of the first address for the last left, right, upper or lower block, the first address for the last right, left, lower or upper block is designated; and, in the case other than the first address for the last left, right, upper or lower block, the relevant block is inversely displayed by designating the first address for the next left, right, upper and lower block.

3. The on-screen display method as claimed in claim 1, wherein the step of generating a single on-screen display signal for producing a display comprising a plurality of graphic expressions corresponding respectively to each of the optional VCR functions further comprises the steps of:

generating an initial address (A1) for each said graphic block defined by said graphic expressions to be displayed;

generating a font address (Add) for each said graphic block having one of said initial addresses (A1), each said font address (Add) having a row number and a column number corresponding to a respective position on said TV screen where said graphic expression is to appear;

determining whether each graphic expression to be displayed has been assigned an initial address (A1); and displaying each said graphic expression on said TV screen in accordance with its corresponding initial address (A1) and font address (Add).

4. A method for selecting one of a plurality of optional functions to be performed by a VCR and a TV having a screen, said method comprising the steps of:

providing a microcomputer with means for storing an initial address (A1) and a plurality of font addresses (Add), said font addresses (Add) each having a row number and a column number corresponding to a position on said TV screen where a graphic expression corresponding to one said optional VCR function is to appear, said microcomputer additionally having a counter (n) for determining if each of said graphic expressions have been displayed;

providing a remote controller with a plurality of POSITION CONTROL keys, an ENTER key and a MENU key for generating signals receivable by said TV;

generating a signal with said MENU key of said remote controller for producing on the TV screen a single on-screen display comprising said plurality of graphic expressions corresponding respectively to each of the optional VCR functions, each said graphic expression being selectable and having a pre-designated graphic color and a pre-designated background color, the graphic color for one said graphic expression being substantially the same as the background colors for each of the other said graphic expressions, and the background color for said one graphic expression being substantially the same as the graphic color for the other of said graphic expressions, such that said one graphic expression is inverted;

incrementing said counter (n) and font address (Add);

determining if said counter (n) is equal to the number of graphic expressions to be displayed;

generating signals with said POSITION CONTROL keys of said remote controller for changing the graphic expression that is inverted to select one graphic expression from among said plurality of selectable graphic expressions being displayed; and generating a signal with said ENTER key of said remote controller for selecting the optional VCR function having the inverted graphic expression displayed on said single on-screen display, whereby the method enables selection of an optional function with a single screen.

5. The method as claimed in claim 4, wherein each said graphic expression defines a graphic block having a unique lateral and longitudinal font address on the TV screen, and upon inputting signals by means of leftward, rightward, upward, and lower POSITION CONTROL keys on said remote controller, a judgement is made as to what a first address LOC for the graphic block is; in the case of the first address for the last left, right, upper, or lower block, the first address for the last right, left, lower, or upper block, is designated; and, in the case other than the first address for the last left, right, upper, or lower block, the relevant block is inversely displayed by designating the first address for the next left, right, upper, or lower block.

6. The method as claimed in claim 4, wherein the step of generating a single on-screen display signal comprises the steps of:

generating an initial address (A1) for each said graphic expression to be displayed;

generating a font address (Add) for each said graphic expression having one of said initial addresses (A1), each said font address (Add) having a row number and a column number corresponding to a position on said TV screen where said graphic expression is to appear;

determining with said counter (n) whether each graphic expression to be displayed has been assigned an initial address (A1); and displaying each said graphic expression on said TV screen in accordance with its corresponding initial address (A1) and font address (Add).

* * * * *